March 9, 1937.　　　J. D. CUNNINGHAM　　　2,073,143

CHART

Filed Jan. 6, 1936　　　2 Sheets-Sheet 1

INVENTOR
JAMES D. CUNNINGHAM
BY
McConkey & Booth
ATTORNEYS.

March 9, 1937.  J. D. CUNNINGHAM  2,073,143

CHART

Filed Jan. 6, 1936  2 Sheets-Sheet 2

INVENTOR
JAMES D. CUNNINGHAM
BY
McConkey & Booth
ATTORNEYS.

Patented Mar. 9, 1937

2,073,143

UNITED STATES PATENT OFFICE 2,073,143

CHART

James D. Cunningham, Chicago, Ill., assignor to Republic Flow Meters Company, Chicago, Ill., a corporation of Illinois Application January 6, 1936, Serial No. 57,657

3 Claims. (Cl. 234—1)

This invention relates to charts and more particularly to rotating charts for recording instruments or the like.

One of the objects of the invention is to provide a chart which can easily be attached to and removed from an instrument without requiring removal of any of the instrument parts and which will always be in proper timed relationship to the instrument.

The invention may be embodied in a chart including a flat disc of paper or the like having a central opening. A series of circles concentric with said opening are formed on the chart and may be graduated in terms of a condition to be recorded, such as pressure, temperature, flow or the like. The circles are crossed by a series of arcuate time lines struck about the center of oscillation of the recording pen and preferably passing through the center of said opening.

The chart is preferably formed with openings arranged to permit the passage of clamp members carried by the driving post of the instrument, and with a timing opening, associated with the above-described central opening.

The above and other objects and features of the invention will be apparent from the following description of the illustrative embodiment shown in the accompanying drawings, in which.

Figure 2:
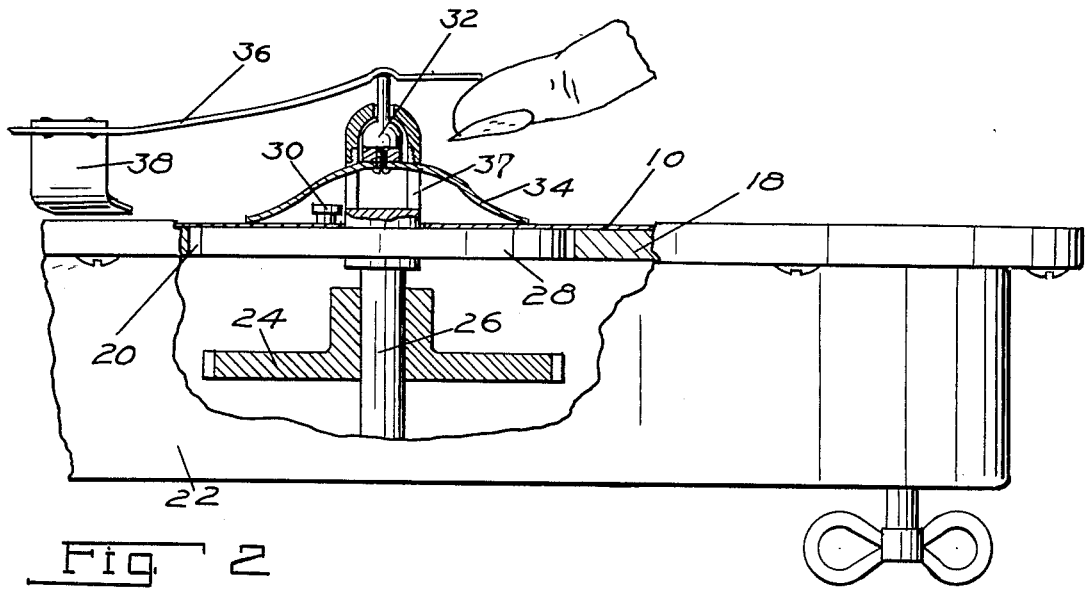
Figure 2 is a section generally centrally through the instrument.
Figure 1:
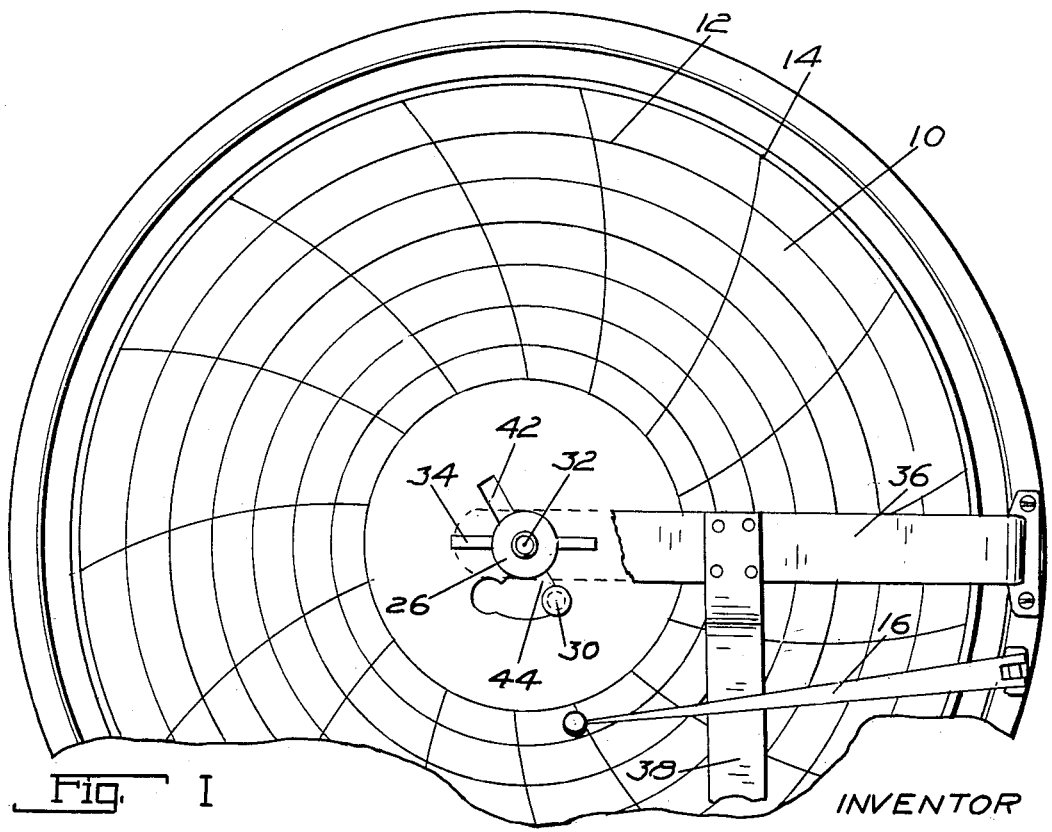
Figure 1 is a top plan view, partly broken away, of a recording instrument embodying one form of my invention.
Figure 3:
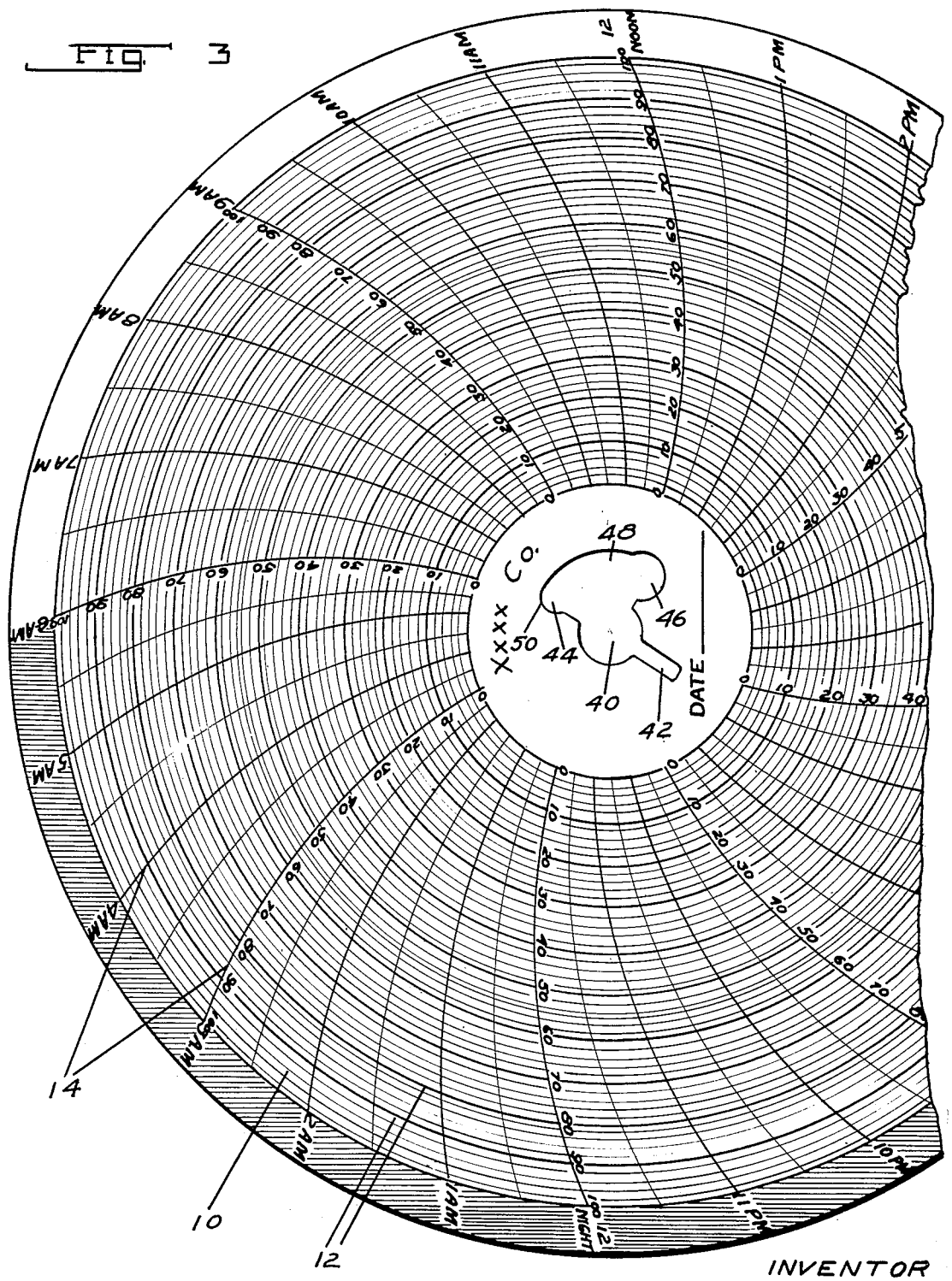
Figure 3 is a partial plan view of the chart used with the instrument.

The chart used with the instrument of Figures 1 and 2, and which is shown in Figure 3, comprises a disk 10 of paper or the like, printed with indicia shown as including a series of concentric circles 12 graduated in terms of temperature, pressure, flow, or other condition to be recorded.

The chart also has printed thereon a series of angularly spaced arcuate time lines 14 representing hours, days, or other time intervals. When the chart is positioned in the instrument, the time lines 14 coincide with the arc of a circle struck by a recording pen 16 (Figure 1) pivoted to swing about a center outside the periphery of the chart, when the chart is in different angular positions corresponding to the times according to which lines 14 are graduated. Preferably the arcs of time lines 14, if extended, would all intersect the common center of the circles 12.

The pen 16 is swung angularly toward and from the center of the chart under the control of means measuring the condition to be recorded, in various ways well known in the recorder art.

The pen 16 is pivoted adjacent the edge of a suitable panel 18, formed with an opening 20, back of which is secured a suitable clock mechanism 22, the last gear 24 of which is shown as adjustably frictionally carrying a cylindrical chart-driving post 26 provided with a chart-supporting part such as a flange 28 having its face in the same plane as the face of the panel 18.

Offset from the center of rotation of the post 26, the flange 28 is provided with a timing projection such as an upstanding headed pin 30.

The upper end of the post 26 is formed as a hollow guide for a central plunger 32 carrying chart-clamping means such as a bowed leaf spring 34 projecting radially outward through slots 37.

When the chart is in position, the plunger 32 is depressed, to actuate member 34 to hold the chart against flange 28, by means preferably including a spring steel pen lifter 36 secured to the edge of the panel 18 and strong enough to overcome the spring arms 34 and hold the chart.

This spring device 36 has secured thereto a leafspring extension 38 which is arranged beneath the pen 16, so that when the device 36 is lifted to release the chart, as shown in Figure 2, it automatically lifts the pen out of the way. When the record is being made, the arm 38 holds the chart against the panel immediately adjacent the pen 16.

The chart 10 has a central opening 40, seated over the post 26 and the center of which is the same as the common center of the circles 12, so that these circles are automatically centered relatively to the axis of rotation of the post 26. It also has extensions or slots 42 and 44 from the opening 40 which pass over the spring arms 34 in inserting and removing the chart.

The chart also has an opening 46 large enough to pass over the head of the timing projection 30, and which continues as an arcuate portion 48 through which the shank of that projection passes when the chart, after insertion in the instrument, is turned to bring the spring arms 34 out of registry with the slots 42 and 44, and at the same time to set the chart in its predetermined timed position with the shank of projection 30 engaging a timing part or edge 50 which has a predetermined angular position relatively to the time lines 14.

As a convenience in manufacturing the charts, the openings 40—42—44—46—48 may all be merged in a composite opening of irregular outline, as shown in Figure 3.

While various illustrative constructions have been described in detail, it is not my intention to limit the scope of the invention by that description, or otherwise than by the terms of the appended claims. The above-described recording instrument is claimed as such in my divisional application No. 77,683, filed May 4, 1936.

I claim:

1. A chart comprising a disc formed with a central positioning opening including a part with at least a considerable portion of its edge on the arc of a circle to receive and be angularly adjustable about a driving post, said opening having associated therewith another opening offset from said central opening and having a generally radially extending timing edge and connected to the central opening by a substantially radial passage, and said chart having a slot projecting from the central opening at a point spaced from said passage, said passage and slot adapted to pass over retaining parts projecting from a driving post which projects through the central opening.

2. A chart comprising a disc formed with a central positioning opening, the edge of a considerable part of said opening lying on the arc of a circle to engage and be angularly adjustable about an instrument post, and another part of said opening being offset from said arc and having an edge of considerable length lying on an arc of greater radius than said first arc and a substantially radially extending timing edge engageable with a timing pin on the instrument.

3. A chart comprising a disc formed with a central substantially circular opening to receive and be angularly adjustable about a driving post, said disc being formed with a plurality of openings shaped to pass over chart clamping members, one of said openings having a substantially radial timing edge and having a substantial arcuate extent so that the chart can be turned to move the openings and clamping members out of register and to bring said timing edge into engagement with a timing member thereby to clamp the chart to an instrument in proper timed relationship thereto.

JAMES D. CUNNINGHAM.